United States Patent [19]

Ratton

[11] 4,269,767
[45] May 26, 1981

[54] DIAZOTIZATION OF AROMATIC AMINES

[75] Inventor: Serge Ratton, La Verpilliere, France

[73] Assignee: Rhone-Poulenc Industries, Paris, France

[21] Appl. No.: 18,024

[22] Filed: Mar. 6, 1979

[30] Foreign Application Priority Data

Mar. 6, 1978 [FR] France ................................ 78 06905

[51] Int. Cl.³ ........................................... C07C 113/00
[52] U.S. Cl. ..................................... 260/141; 260/205
[58] Field of Search ............................ 260/141 P, 205

[56] References Cited

U.S. PATENT DOCUMENTS

| 4,018,751 | 4/1977 | Trecek | 260/205 |
|---|---|---|---|
| 4,020,052 | 4/1977 | Detrick | 260/141 P |

*Primary Examiner*—John F. Niebling
*Attorney, Agent, or Firm*—Burns, Doane, Swecker & Mathis

[57] ABSTRACT

Aromatic amine salts are diazotized, in aqueous solution/suspension, utilizing a nitrogenous vaporous admixture as the diazotizing agent, said admixture comprising nitric oxide and nitrogen peroxide, with the content of NO therein being in substantial excess with respect to the $NO_2$.

The resulting solutions of aryldiazonium salts are useful in the preparation of aromatic azoamines.

15 Claims, No Drawings

DIAZOTIZATION OF AROMATIC AMINES

BACKGROUND OF THE INVENTION

1. Field of the Invention

The present invention relates to a novel process for the preparation of aqueous solutions of diazonium salts of the aromatic amines.

2. Description of the Prior Art

It is conventional to prepare diazonium salts in aqueous solutions by gradually introducing an alkali metal nitrite into a medium containing the amine salt and a free acid. Such processes are satisfactory as regards the yields of the diazonium salt; however, these processes exhibit a significant disadvantage from an industrial point of view. In fact, during the reaction, inorganic species (typically sodium chloride and the like) are produced in stoichiometric amounts and same must be separated therefrom and treated for the purpose of reducing pollution.

A few diazotization techniques employing nitrogenous vapors as the diazotizing agent have been described in the literature. Diazotization by nitrogenous vapors was essentially carried out in an organic medium (ethyl ether, benzene or dimethylforamide) on the free amine or on the amine salt (hydrochloride or the like). It was demonstrated that nitric oxide, NO, was by far the best diazotizing agent [J. Rigaudy et al, *Comptes-Rendus de l'Académie des Sciences*, 258 (4) 1,529-31 (1964), 258 (19) 4,799-802 (1964) and 261 (25) 5,516-19 (1965)]. It was also demonstrated in these same publications that poor results were obtained when using nitrogen peroxide, $NO_2$, or nitrogen trioxide, $N_2O_3$, as the diazotizing agent.

Japanese Patent No. 4,331(67) of Sankyo Chemical Industries, bearing date of May 11, 1964, describes a process for the preparation of diazonium hydrochloride in aqueous solution by the introduction of pure NO into a solution of aniline hydrochloride containing free hydrochloric acid. It is particularly recommended in this patent to avoid contamination of the nitric oxide, NO, with nitrogen peroxide, $NO_2$.

Furthermore, the note of A. Sanfourche and J. Bureau, *Comptes-Rendus de l'Académie de Sciences*, 202, 66-69, 6/1 (1936), reflects that it is possible to employ nitrogen peroxide, $NO_2$, or an equimolecular mixture of NO and $NO_2$ as the diazotizing agent.

When the diazotization processes are carried out by reacting NO or $NO_2$, or an equimolecular mixture of NO and $NO_2$, with an aqueous solution of amine salt, optionally containing some free acid, it has been found that the yields of diazonium salt are on the order of 50%, relative to the diazotizing agent employed. Moreover, it too has been observed that nitric oxide, NO, is a slow diazotizing agent from the point of view of reaction kinetics. Furthermore, the use of nitrogen peroxide, $NO_2$, entails the formation of nitric acid, and this if of course a disadvantage from an industrial point of view because of the production and steady increase in the amount of such additional strong acid. Thus, there exists a need in this art for an alternative diazotization reaction, devoid of the aforenoted drawbacks.

SUMMARY OF THE INVENTION

Accordingly, a primary object of the present invention is to provide a novel process for the preparation of diazonium salts in aqueous solution, and wherein vaporous oxides of nitrogen are employed as the diazotizing agent and are reacted with an aqueous solution of aromatic amine salt, said reaction being characterized in that the nitrogenous vapors comprise nitric oxide and nitrogen peroxide, the nitric oxide being in substantial excess vis-a-vis the peroxide in the gaseous mixture.

The utilization of such a mixture rich in nitric oxide enables diazotization of aromatic amines, which are dissolved or suspended in water in the form of a salt, with rapid kinetics and in quantitative yield, relative to the aromatic amine and relative to the diazotizing agent consumed. No additional acidity, moreover, results.

DETAILED DESCRIPTION OF THE INVENTION

More particularly, the nitrogenous vapors employed in accordance with the process of the invention feature a mixture of NO, $NO_2$ and $N_2O_3$, such that the molar ratio $NO/NO_2$ at equilibrium is between 2 and 100, and preferably between 4 to 50.

According to one embodiment of the invention, it is possible to prepare the appropriate nitrogenous vapors by simply mixing nitric oxide, NO, with nitrogen peroxide, $NO_2$, this mixture instantaneously reaching equilibrium at ambient temperature. For the molar proportion $NO/NO_2$ to be satisfied at equilibrium within the limits indicated above, it suffices, for example, for the NO and $NO_2$ to be initially mixed in a molar ratio of more than 2; a convenient technique for accomplishing this consists in entraining liquefied $NO_2$ within a stream of NO. It is of course possible to monitor the compositional nature of the mixture of NO, $NO_2$ and $N_2O_3$ at equilibrium employing suitable conventional devices, such as a visible/UV spectrophotometer. If the initial mixture is not sufficiently rich in NO, more NO can be injected, so that the new ratio $NO/NO_2$ at equilibrium is more than 2.

It is also envisaged to prepare the nitrogenous vapors according to the invention by starting from a mixture of NO and $N_2O_3$ which instantaneously reverts to equilibrium at ambient temperature. A simple means for achieving this consists in charging liquefied nitrogen trioxide into the reactor while entrained within a stream of nitric oxide. It is obviously desirable to recycle, into the reactor, the nitric oxide which escapes from the latter. The molar ratio $NO/N_2O_3$ must be selected such that the molar ratio $NO/NO_2$ at equilibrium is in excess of 2. This can be conveniently achieved if the initial ratio $NO/N_2O_3$ is itself more than 2.

The nitrogenous vapors which are employed according to the invention can be diluted, if necessary, with an inert gas such as nitrogen.

The subject process can be carried out quite simply from an industrial point of view. There simply need be available, on the one hand, a supply of nitric oxide, NO, which can be recycled, and, on the other hand, a stream of feed gas consisting of a mixture of NO and $NO_2$ in approximately stoichiometric proportions. It is known that a mixture of this type can readily be obtained by oxidizing ammonia gas with oxygen. The nitric oxide and the stream of feed gas will be mixed in order to satisfy the specifications, given above, regarding the molar ratio $NO/NO_2$. The formation of the diazonium salt will involve the consumption of equimolecular proportions of the NO and $NO_2$. The flow rate of the feed gas is selected such that all of the $NO_2$ introduced is consumed. It will then suffice to recycle, into the reactor, all of the NO which escapes therefrom.

As above mentioned, the process according to the invention is carried via the action of the nitrogenous vapors, which are rich in NO and the composition of which has been defined above, on an aqueous solution of aromatic amine salt. The amine salt is typically the amine hydrochloride. It is of course possible to use other aromatic amine salts, such as the salts of hydrobromic acid, sulfuric acid (in which case a dilute acid must be used in order to avoid secondary sulfonation reactions), phosphoric acid and nitric acid, or also the salts of organic acids, such as acetic acid. If desired, it is also possible to employ a mixture of the salts of the above acids. The concentration of the amine salt in the water is not critical. It is generally less than the concentration existing at saturation (but it is also possible to use an aqueous suspension of amine salt if the amine salt is sparingly soluble) and said concentration is typically between 0.05 and 2.5 mols per liter. In addition, the medium can optionally contain some acid in the free state, in a relatively small proportion, the proportion of the free acid being such that the ratio free acid/amine salt is between 0.01 and 0.2. The presence of the free acid, even at low concentration, generally favors the stability of the diazonium salt.

The introduction of the nitrogenous vapors can be continued until the amine salt has been totally converted. However, the nitrogenous vapors can be introduced in an amount which is less than theoretical. This, then, affords a solution of aryldiazonium salt which contains an amine salt and which can be used directly to produce the aromatic azoamines.

The process for the preparation of aqueous solutions of diazonium salts is obviously of considerable industrial value in the case of aniline. However, it is possible to use other aromatic amines, such as naphthylamines, halogenoanilines, alkylanilines having from 1 to 2 alkyl groups which are not attached to the nitrogen atom and which contain from 1 to 4 carbon atoms, such as the ortho-, meta- or para-toluidines, aminophenols or aminocresols, and the like.

The process according to the invention is carried out at a temperature which is advantageously between 0° and 50° C., and preferably between 0° and 20° C. The appropriate nitrogenous vapors are introduced gradually until the amine has completely disappeared. The total reaction time is generally less than 30 minutes. The resulting solutions of diazonium salts are chemical reagents which are suitable for all of the uses suggested in the chemical literature, without any restriction. In particular, these solutions can be used directly for the one-step production of an aromatic azoamine by the gradual introduction of the solution of diazonium salt into a medium containing the free amine, water and, optionally, an amine salt. More precisely, conditions for using the solutions of diazonium salts have been determined which make it possible to obtain the aromatic azoamines in good yields and with rapid kinetics.

The present invention, therefore, also relates to the use of the solutions of diazonium salts of the invention to obtain the aromatic azoamines in good yields and with rapid kinetics. This use is characterized in that the solution of diazonium salt according to the invention is introduced into a medium which essentially consists of the aromatic amine, a salt of the aromatic amine and water, the various percentages by weight of these three constituents in the reaction medium, respectively designated as $\alpha$, $\beta$ and $\gamma$, being such that the following relationships exist at all times over the course of the reaction.

$$10 < \alpha < 70$$

$$13 < \beta$$

$$5 < \gamma$$

$$\alpha + \beta + \gamma = 100$$

Within the range of concentrations which have been above defined, it has been found that the rearrangement reaction is complete for a total duration of considerably less than 2 hours at 50° C. If a relatively low aromatic amine content (for example, less than 45%) is used, it is beneficial to increase slightly the minimum amount of the amine salt content. For aromatic amine contents of about 10%, it has been observed that advantageous results are obtained when the amine salt content is not less than 18% throughout the reaction. Furthermore, since the concentrations of the reactants change during the course of the reaction, the maximum amount of water which can be introduced with the aryldiazonium salt will be taken into account so as to remain within the concentration ranges defined above.

The process is particularly useful for the production of p-aminoazobenzene from aniline and aniline hydrochloride.

It is of course possible to prepare aromatic azoamines by employing aromatic amines other than aniline. It has been found that, by observing the noted relationship, namely:

$$10 < \alpha < 70$$

$$13 < \beta$$

$$5 < \gamma$$

$$\alpha + \beta + \gamma = 100$$

($\alpha$, $\beta$ and $\gamma$ then representing the percentages by weight of aromatic amine, aromatic amine salt and water, respectively), it is possible to obtain the corresponding aromatic azoamines in good yields and with rapid kinetics. The nature of the aromatic amines is as specified above in the context of the process for the production of aqueous solutions of aryldiazonium salts.

It is also possible to use other aromatic amine salts in order to obtain the aromatic azoamines. These salts are defined above under the description of the aqueous solutions of the aryldiazonium salts.

The process for the production of the aromatic azoamines is advantageously carried out at temperatures between 25° and 100° C., and preferably between 30° and 60° C. In a preferred embodiment, the total reaction time is considerably less than 1 hour.

As already stated, the medium in which the reaction for the production of the aromatic azoamines is carried out essentially consists of the aromatic amine, the aromatic amine salt and water. According to another embodiment of the present invention, small amounts of another ingredient, such as an alcohol, which does not fundamentally alter the basic method of carrying out the process and which satisfies the main objective of the process, namely, that it is within the ambit of the general formula regarding the percentages by weight $\alpha$, $\beta$ and $\gamma$, can optionally be added to the reaction medium consisting of the aromatic amine, aromatic amine salt and water. The use of a compound such as an alcohol makes it possible to reduce the concentration of aromatic amine, while maintaining the concentration of aromatic amine salt constant, and optionally makes it possible to avoid the development of an aqueous phase in the reaction medium. In the case of an industrial process, this is advantageous because the amounts of aromatic amine to be recycled are reduced.

The invention, therefore, provides a route to aromatic azoamines, which compounds are very important from the industrial point of view; they are, for example, precursors of aromatic diamines such as p-phenylenediamine.

In order to further illustrate the present invention and the advantages thereof, the following specific examples are given, it being understood that same are intended only as illustrative, and in nowise limitative.

In the examples which follow, the yield of benzenediazonium salt was determined by reacting the benzenediazonium solution with aniline and then rearranging the intermediate triazene to give aminoazobenzene. Thus, the solution containing the diazonium salt was charged into a mixture containing aniline, in large excess (5 to 7 times the theoretical amount), aniline hydrochloride, in half the stoichiometric amount relative to the aniline, and water. The mixture was maintained at 50° C. and aminoazobenzene (ortho and para isomers) was obtained very rapidly in quantitative yield. The excess aniline hydrochloride was then neutralized, the aniline and the aminoazobenzene were extracted with ethyl acetate, and the ethyl acetate and the aniline were distilled. This yields crude aminoazobenzene (ortho+para), the composition of which was determined by vapor phase chromatography.

EXAMPLE 1

2.52 g (0.05477 mol) of nitrogen peroxide, $NO_2$, were condensed into a trap cooled to $-5°$ C., and nitric oxide, NO, was bubbled into the liquid up to the saturation point; 4.16 g of a stoichiometric mixture of NO and $NO_2$, namely $N_2O_3$, were thus obtained.

The $N_2O_3$ thus obtained was entrained, over the course of 15 minutes, in a stream of NO at the rate of 15 liters/hour and charged into 300 ml of an aqueous solution of 14.46 g (0.1095 mol) of aniline hydrochloride (molar ratio $NO/N_2O_3$:3, which affords a value of $NO/NO_2=7$ at theoretical equilibrium).

The stream of NO was recycled. The temperature of the reaction solution was 2° C.

The yield of the diazotization was monitored after the formation of aminoazobenzene, in accordance with the method described above. 21.6 g of aminoazobenzene were obtained. The yield of the diazotization was 100%, relative to aniline and $N_2O_3$. The absence of $HNO_3$ in the aqueous solution of the benzenediazonium salt was confirmed.

EXAMPLE 2

20 g (0.0435 mol) of nitrogen peroxide, $NO_2$, were condensed into a trap cooled to $-5°$ C., and nitric oxide, NO, was bubbled into the liquid up to the saturation point; 3.3 g of a stoichiometric mixture of $NO+NO_2$ were obtained. The $N_2O_3$ thus obtained was entrained in a stream of pure NO at the rate of 15 liters/hour, for 15 minutes, and charged into 300 ml of an aqueous solution containing 13 g of 58% pure aniline sulfate (i.e., 0.0896 mol of aniline). The molar ratio $NO/NO_2$ at equilibrium was 8.1. The procedure of Example 1 was then repeated.

The yield of the diazotization was monitored by coupling with aniline. 17.2 g of aminoazobenzene were obtained. The yield of the diazotization was, therefore, quantitative, relative to the aniline and $N_2O_3$.

EXAMPLE 3

3.8 g of liquefied $N_2O_3$ (0.05 mol of $N_2O_3$) were entrained by pure NO at the rate of 15 liters/hour, for 20 minutes (by the same method as in Examples 1 and 2), and charged into an aqueous solution containing 15.63 g (0.1 mol) of aniline nitrate. (The molar ratio $NO/NO_2$ at equilibrium was 9.2).

The yield of the diazotization was monitored by the coupling reaction with aniline. After rearrangement of the triazene intermediate, the aminoazobenzene was recovered and the yield of the diazotization was quantitative.

EXAMPLE 4

3.8 g of $N_2O_3$ (0.05 mol of $N_2O_3$) were entrained by a stream of pure NO at the rate of 15 liters/hour for 20 minutes, in accordance with the technique described in Example 3, and charged into 300 ml of an aqueous solution containing 10.9 g (0.1 mol) of para-aminophenol and 4.9 g of 100% strength $H_2SO_4$. The 4-hydroxybenzenediazonium sulfate formed was initially determined by potentiometry in an 0.5 N sodium hydroxide solution and, secondly, by coupling with resorcinol. The results indicated that the yield of diazotization was quantitative.

EXAMPLE 5

1.6 g (0.035 mol) of liquefied $NO_2$ were entrained for 16 minutes by a stream of pure NO at the rate of 12 liters/hour and charged into 75 ml of an aqueous solution which was maintained at $+5°$ C. and contained 0.076 mol of aniline hydrochloride. The ratio $NO/NO_2$ at equilibrium was on the order of 6.8.

At the completion of the reaction, the above solution, which contained benzenediazonium chloride and excess aniline hydrochloride, was introduced into a mixture which was maintained at 50° and contained 100 ml of aniline and 80 g of aniline hydrochloride.

At the completion of the reaction, 13.05 g of aminoazobenzene were recovered, namely, the yield of diazotization was 95%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an aqueous solution of an aryldiazonium salt, comprising diazotizing an aqueous solution of an aromatic amine salt with a nitrogenous vaporous admixture which comprises nitric oxide and nitrogen peroxide, the molar ratio of $NO/NO_2$ in said admixture being at least 2.

2. The process as defined by claim 1, said molar ratio being between 2 and 100.

3. The process as defined by claim 2, said molar ratio being between 4 and 50.

4. The process as defined by claim 1, the aromatic amine salt being a salt of an aromatic amine selected from the group comprising aniline, naphthylamine, halogenoaniline, aminophenol, aminocresol, toluidine, and alkylaniline bearing 1 or 2 lower alkyl substituents, which substituents are not N-substituents.

5. The process as defined by claim 1, said aromatic amine salt being aniline hydrochloride.

6. The process as defined by claim 1, the diazotization being conducted at a temperature of from 0° to 50° C.

7. The process as defined by claim 1, the concentration of the aromatic amine salt in the aqueous solution being between 0.05 and 2.5 mols per liter.

8. The process as defined by claim 1, further comprising converting the resultant aryldiazonium salt into an aromatic azoamine by coupling and rearrangement of a reaction mixture which comprises the resultant aryldiazonium salt in aqueous solution, the aromatic amine ($\alpha$), a salt of the aromatic amine ($\beta$), and water ($\gamma$), with the percentage weight relationship existing among the components $\alpha$, $\beta$ and $\gamma$ such that:

$$10 < \alpha < \zeta$$

$$13 < \beta$$

$$5 < \gamma$$

$$\alpha + \beta + \gamma = 100.$$

9. The process as defined by claim 8, comprising the preparation of p-aminoazobenzene from aniline and aniline hydrochloride.

10. The process as defined by claim 2, further comprising the recycling of unreacted nitric oxide.

11. The process as defined by claim 2, wherein the nitrogenous vaporous admixture comprises liquefied nitrogen peroxide entrained in a stream of gaseous nitric oxide.

12. The process as defined by claim 2, said aqueous solution further comprising the free acid of the salt moiety which comprises the aromatic amine salt, in the ratio of free acid to amine salt of from 0.01 to 0.02.

13. A process for the preparation of an aqueous solution of an aryldiazonium salt, consisting essentially of diazotizing an aqueous solution of an aromatic amine salt with a nitrogenous vaporous admixture which comprises nitric oxide and nitrogen peroxide and wherein the molar ratio of $NO/NO_2$ in said admixture is at least 2.

14. The process as defined by claim 13 wherein said molar ratio is between 2 and 100.

15. The process as defined by claim 14 wherein said molar ratio is between 4 to 50.

* * * * *